United States Patent [19]

Saito

[11] Patent Number: 5,214,697
[45] Date of Patent: May 25, 1993

[54] PROGRAM EXECUTION APPARATUS FOR ENSURING SECURITY OF A PROGRAM

[75] Inventor: Yasuo Saito, Yokohama, Japan

[73] Assignee: Kabushiki Kaisha Toshiba, Kawasaki, Japan

[21] Appl. No.: 676,118

[22] Filed: Mar. 27, 1991

[30] Foreign Application Priority Data

Mar. 27, 1990 [JP] Japan ................................ 2-77446

[51] Int. Cl.⁵ .............................................. H04L 9/00
[52] U.S. Cl. ............................................ 380/4; 380/23; 380/24; 380/25; 380/49; 380/50; 235/379; 235/380
[58] Field of Search .................... 380/4, 9, 23, 25, 28, 380/49, 50, 24; 235/379, 380

[56] References Cited

U.S. PATENT DOCUMENTS

| 4,168,396 | 9/1979 | Best ............................. 380/4 |
| 4,278,837 | 7/1981 | Best ............................. 380/4 |
| 4,319,079 | 3/1982 | Best ............................. 380/4 |
| 4,433,207 | 2/1984 | Best ............................. 380/4 |
| 4,465,901 | 8/1984 | Best ............................. 380/4 |
| 4,847,902 | 7/1989 | Hampson .................... 380/4 |
| 5,058,164 | 10/1991 | Elmer et al. ............... 380/50 |
| 5,060,263 | 10/1991 | Bosen et al. ............... 380/25 |

FOREIGN PATENT DOCUMENTS 0008033 2/1980 European Pat. Off. .
0114522 8/1984 European Pat. Off. .
0137995 4/1985 European Pat. Off. .

Primary Examiner—Bernarr E. Gregory
Attorney, Agent, or Firm—Foley & Lardner

[57] ABSTRACT

A micro controller which has a first memory in which invertedly enciphered program data is stored, a second memory which stores cipher key data necessary for decoding the password stored in the first memory, a CPU which controls writing data to or reading data from the first and second memories and a unit which descrambles the cipher in the program data stored in the first memory based on the key data stored in the second memory, when the CPU accesses the first memory. The operation of this CPU is based on the program data which is decoded using the descrambling unit, which makes it possible to effectively block decoding or altering of programs and data.

3 Claims, 2 Drawing Sheets

PROGRAM EXECUTION APPARATUS FOR ENSURING SECURITY OF A PROGRAM

BACKGROUND OF THE INVENTION

This invention relates to a micro controller and more particularly to micro controllers that are used where security is necessary such as in IC cards and data banks.

In conventional micro controllers, program security was disregarded and the micro controller was operated directly from the program stored in the memory.

In this kind of micro controller, the program stored in memory could easily be decoded or altered and so when used with IC cards or data banks that require a high level of security, maintaining security was not adequate.

SUMMARY OF THE INVENTION

The object of this invention is to provide a micro controller that makes it possible to effectively block decoding or altering of programs or data.

According to this invention, there is provided a micro controller comprising a first memory in which invertedly enciphered program data is stored, a second memory which stores cipher key data necessary for decoding the data stored the first memory, a CPU which controls the writing of data to and the reading of data from the first and second memories, and means, based on the cipher key data stored the second memory, for descrambling in the program data stored in the first memory when the CPU accesses the first memory. The operation of this CPU is based on the program data which is decoded using the said means for descrambling.

By using a micro controller like this, the enciphered program data of the first memory is decoded using the descrambling means based on cipher key data stored in the second memory and the CPU is operated based on this decoded program data. In this way, the micro controller of this invention can block decoding or altering of programs and data and can be used in building a system with a high level of security.

DESCRIPTION OF THE PREFERRED EMBODIMENT

Figure 1:
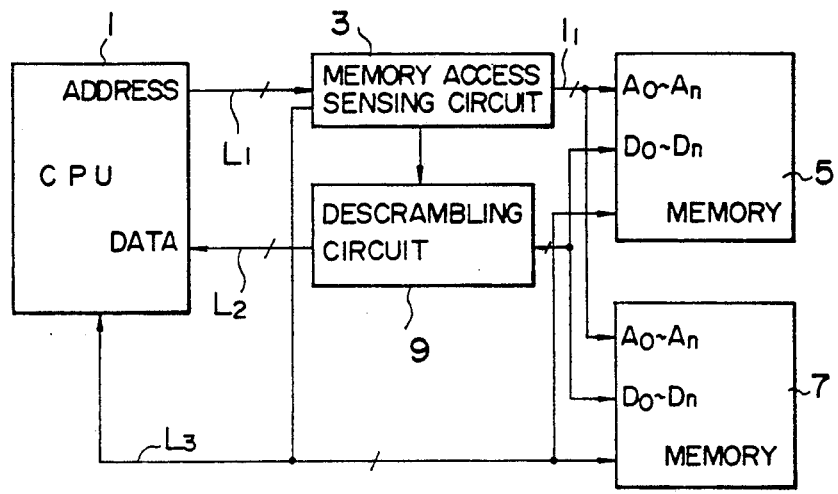
FIG. 1 is a block diagram of one embodiment of the construction of the micro controller of this invention.

FIG. 1 shows the construction of one embodiment of the micro controller of this invention. The micro controller of this embodiment comprises a CPU 1 and two memories 5 and 7 that are accessed by the CPU 1. The CPU 1 and the two memories 5 and 7 are connected by way of the address bus L1, the data bus L2 and the control bus L3. A memory access sensing circuit 3 is located along the address bus L1 and a descrambling circuit 9 is located along the data bus L2.

The main program is stored in the memory 5 and is scrambled, that is, one portion of the data is invertedly enciphered. The data which is the necessary cipher key for decoding the password hidden in the data of the memory 5, is stored in memory 7. The memory access sensing circuit 3 senses whether the CPU 1 is accessing the memory 5 based on the address signal sent from the CPU 1 along the address bus L1 and the control signal sent from the CPU 1 along the control bus L3. Based on the cipher key data stored in the memory 7, the descrambling circuit 9 descrambles the data in the memory 5 which is accessed by the CPU 1. That is, it decodes the cipher.

Figure 2:
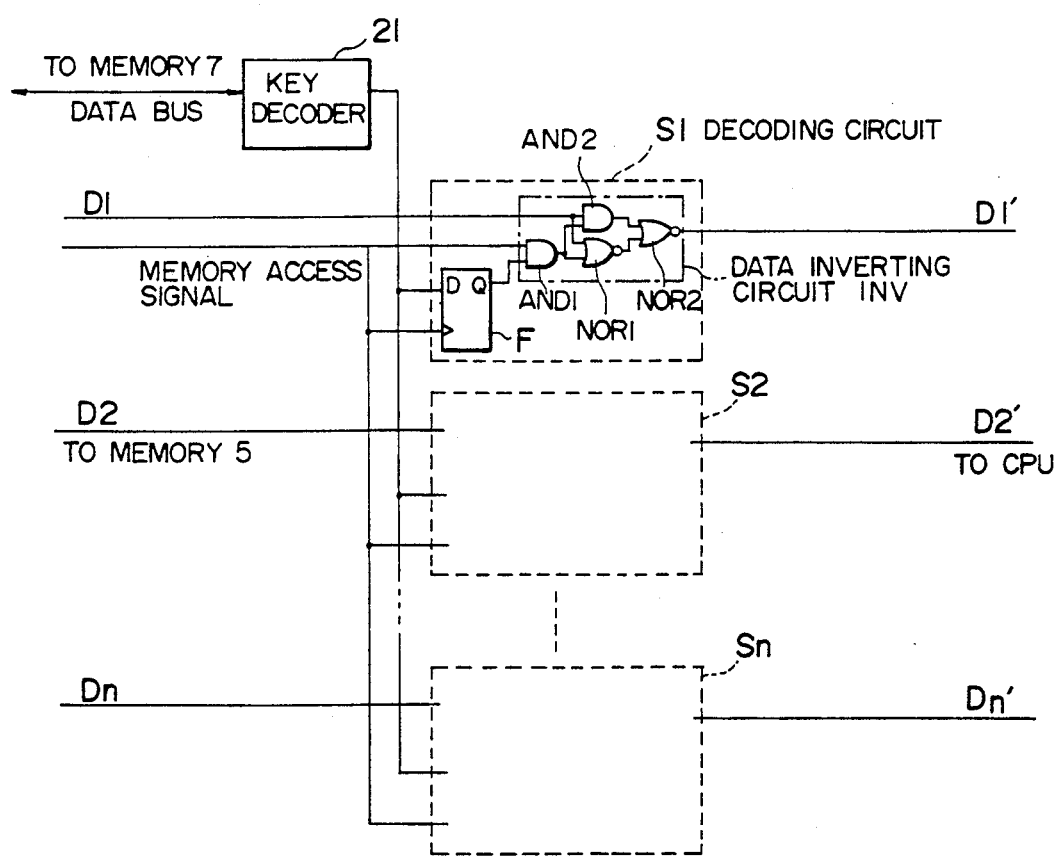
FIG. 2 is a circuit diagram showing one detailed example of the descramble circuit of this invention.

A detailed example of the descrambling circuit 9 is shown in FIG. 2. The descrambling circuit 9 of this detailed example comprises a key decoder 21 and decoding circuits Si (i=1, ... n) which correspond to the data lines Di (i=1, ... n) for each data bit of the data code Do−Dn or n bit program code stored in the memory 5. Each of the decoding circuits Si comprises a D flip-flop F and a data inverting circuit INV which is made up of 2 AND circuits and 2 NOR circuits. Using data code D1 as an example, the memory access signal being sent to the memory 5 is input at the clock terminal of flip-flop F and an input terminal on one side of the AND 1 circuit inside the inverting circuit. The output Q of the flip-flop F is input at the input terminal on the other side of the AND 1 circuit and the output of the AND 1 circuit is input to one of the input terminals on the AND 2 circuit and the NOR 1 circuit. The data code D1 is input to the other input terminal on the AND 2 circuit and the NOR 1 circuit. The outputs of these are then input to the NOR circuit 2 and outputs as D1'.

Figure 3:
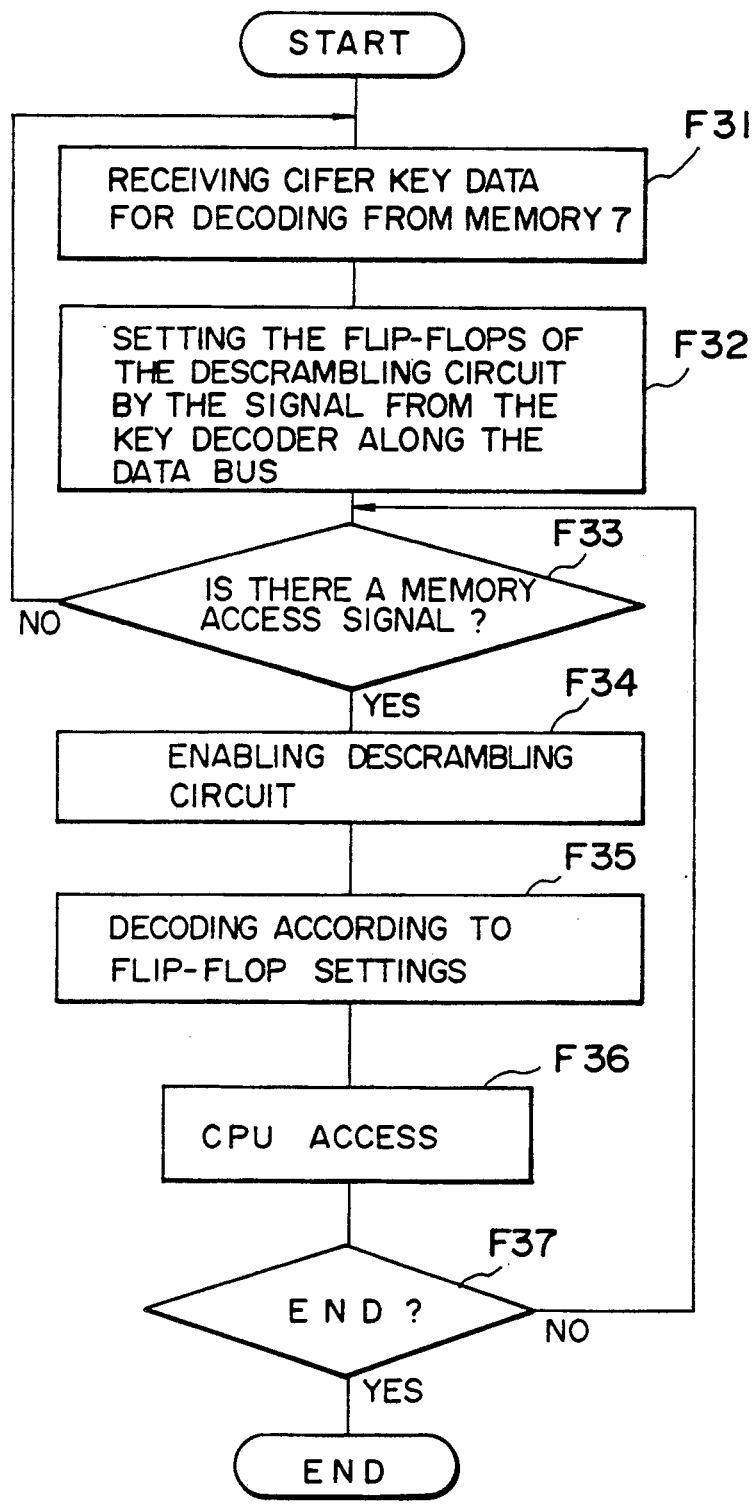
FIG. 3 is a flowchart describing the operation of the function of an example of this invention.

Next the operation of this embodiment will be explained using FIGS. 1 through 3.

First, controlled by the CPU 1, the cipher key data for decoding stored in the memory 7 is sent to the descrambling circuit 9 by way of the address signal bus L1 and the control signal bus L3. The cipher key data is sent to the key decoder 21 of the descrambling circuit 9 and decoded. The flip-flop F of the decoding circuits Si are set to either "1" or "0" based on this decoded signal (see steps F31 and F32 of FIG. 3). Next, when the CPU 1 accesses the memory 5, the memory access sensing circuit 3 senses this and sends a sensing signal to the descrambling circuit 9 (see step F33 of FIG. 3). When this happens, the descrambling circuit 9 becomes enabled (see step F34 of FIG. 3). At this time, if the flip-flop F of the decoding circuit Si is "1" then the enable signal of the data inverting circuit INV becomes "1" and the data Di on the data line connected to the decoding circuit Si is inverted. If the flip-flop F of the decoding circuit Si is "0" then the data Di on the data line connected to the decoding circuit Si is not inverted (see step F35 of FIG. 3). The descrambled data D'1-D'n are then sent to the CPU 1 and executed. When the CPU 1 accesses the memory 7, the entire descrambling circuit becomes disabled and the data from the memory 7 is sent to the CPU 1 without being descrambled.

According to this embodiment, the scrambled programs or data stored in the memory 5 are descrambled by the descrambling circuit 9 using the key data stored in the memory 7 and the CPU 1 operates using the decoded programs or data. As a result, a micro controller of this embodiment can effectively block decoding or altering of programs and data.

Furthermore, if several types of decoding key data are stored in the memory 7, several types of ciphers can be given to one program, thus making it very difficult for a third party to decode them. Also, because descrambling circuits designed as hardware can be freely operated using the software, it is not necessary to change the hardware to match the cipher types of the software. It becomes possible for the cipher key data to be set by the software and not by changing the hardware and so the software designers can determine the cipher key data without having to inform the hardware designers, thus increasing security and making it possible for use in all kinds of systems.

What is claimed is:

1. A program execution apparatus comprising:
a first memory for storing enciphered program data of n bits;
a second memory for storing encoded key data which enables deciphering;
means for accessing said first and second memories;
memory access sense means for sensing accessing of said first and second memories;
decoding means for decoding said encoded key data stored in said second memory into decoded bits;
decipher means for deciphering said program data, said decipher means having n deciphering circuits provided for n data lines of said first memory means, said data lines corresponding to said n bits of said program data, said deciphering circuits being enabled when said decoded bits of said key data are enables; and
means for executing program data deciphered by said decipher means.

2. A program execution apparatus according to claim 1, wherein said second memory stores a plurality of different key data.

3. A program execution apparatus according to claim 1, wherein said deciphering circuit is comprised of holding means for holding bit status of said decoded bits of said key data, and a logical output means for outputting said bits of said program data in an inverted form when an output of said holding means is in a certain status.

* * * * *